United States Patent

[11] 3,525,372

[72] Inventor John C. Haven
Phoenix, Ariz.

[21] Appl. No. 719,561
[22] Filed April 8, 1968
[45] Patented Aug. 25, 1970
[73] Assignee Motorola, Inc.,
Franklin Park, Illinois
a Corp. of Illinois

[54] AUTOMATIC FABRICATION MACHINES
11 Claims, 12 Drawing Figs.

[52] U.S. Cl. 140/147
[51] Int. Cl. B21f 1/02
[50] Field of Search 140/147; 72/405 (E.C. Dig.)

[56] References Cited

UNITED STATES PATENTS

| | | | |
|---|---|---|---|
| 3,225,797 | 12/1965 | Stoody | 140/147 |
| 3,319,668 | 5/1967 | Shambelan | 140/147 |
| 3,344,816 | 10/1967 | Zemek | 140/147 |

*Primary Examiner*— Lowell A. Larson
*Attorney*—Mueller, Aichele and Rauner

ABSTRACT: A cyclically operable fabrication machine having two work stations along a single unit-feeding track that transports electrical units with leads extending in a first direction. The stations have successively operated work-performing members actuated by a single power-transfer assembly. Both stations are mounted on the same opening and closing power-transfer members. When an electrical unit is in each station, the leads of the unit in the second station are formed in the first part of the cycle while the unit leads in the first station are combed during the second or over-travel portion of a machine cycle. Semiconductor unit-transfer means index the electrical units through the two work stations. The first station has a pair of lead combs which comb the unit leads in a sweeping manner.

INVENTOR
JOHN C. HAVEN
BY
Mueller Aichele & Rauner
ATTORNEYS

AUTOMATIC FABRICATION MACHINES

BACKGROUND OF THE INVENTION

The present invention relates to machines for processing electrical components, particularly those components having a plurality of leads extending therefrom in one direction. One aspect of this invention relates to machines for prestraightening and forming leads of components.

Electrical devices, such as transistors and other semi-conductor units, are mass produced and prepackaged by manufacturers. During the fabrication processes, the electrical leads extending from the package assembly are subject to deformation, twisting and general misalignment which prevents their successful operation, further processing or shipping in unit carriers. Complex lead-straightening machines have been constructed to comb or partially straighten or untangle the leads during a first operation; then in a second operation the leads are formed or further straightened. Such machines have utilized asynchronous combing stations and lead-forming stations requiring independent or separate power-transfer assemblies. Stations in these machines have usually been spaced apart to facilitate storage of semiconductor units intermediate the two stations. Gravity-feed techniques are used after the transistor units have been prealigned and then dropped into a vertical unit-feeding track. The units descend to a first or combing work station. After the combing operation the transistors are then reinserted into a second vertical unit-feeding track (which may be a continuation of the first mentioned track) below the combing station and then temporarily stored before being inserted into a second or lead-forming work station. From the lead-forming work station the units are either dropped into a carrier or a storage bin. The term "vertical track" refers to any unit-feeding track whether it be vertical or at some oblique angle.

Such machines have often required sensing devices along the vertical unit-feeding tracks to sense whether or not there are electrical units to be worked upon such that the power may be turned on or off to the two different work stations performing their respective functions at alternate times.

SUMMARY OF THE INVENTION

It is an object of the invention to provide a machine which synchronously operates two work stations from a single power source such that two work functions are performed during each machine cycle on two different units. Another object of the invention is to provide lead combing in a lead-straightening machine with a minimum number of simple components.

A feature of the present invention provides mounting a combing station on power-transfer members in a lead-forming station. The combing members are engaged simultaneously with the engagement of the lead-forming members but are moved forwardly to comb or straighten the leads of the device subsequent to the closure of the lead-forming dies such that work performed by the machine is successively performed in the two work stations.

Another feature is the provision of pivotally mounted combs on the power-transfer members of the second or lead-forming work station and providing an over-travel in the actuating mechanism such that the combs can be moved forwardly subsequent to the closure of the lead-forming dies.

Another feature is the operation of two work stations in a machine which performs successive operations on a given unit being processed with each work station having work-performing members actuated to perform work by the same power-transfer assembly.

THE DRAWING

Figure 1:
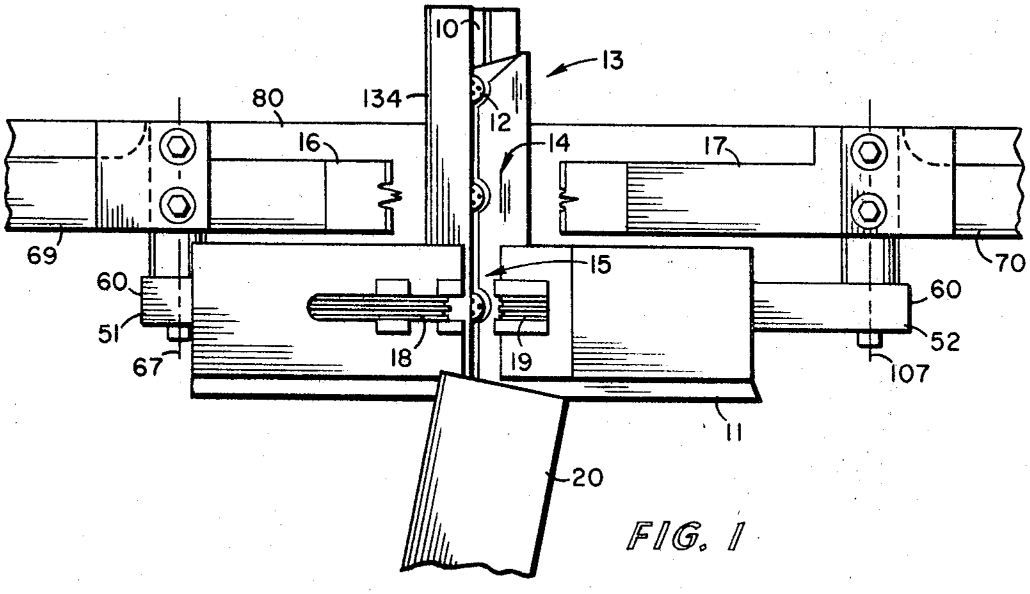
FIG. 1 is a diagrammatic partial front-elevational view of a machine incorporating the teachings of the present invention and which shows the vertical relationships between the unit-feeding track, combing station and lead-forming station.
Figure 3:
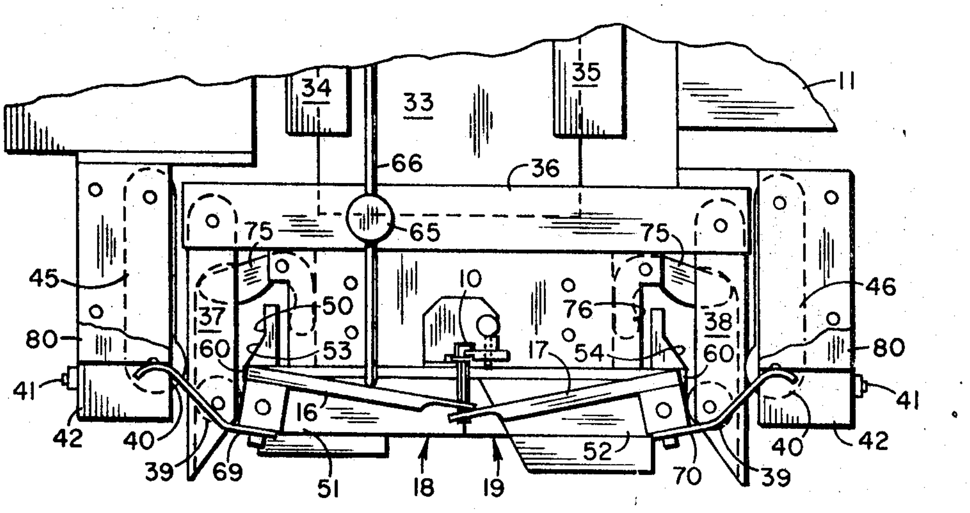
FIG. 3 is a diagrammatic partial plan view of the FIG. 1 apparatus in a work position and with a portion of a cover plate removed for more clearly illustrating the single power source and power-transfer assembly.
Figures 3A, 4, 5, 6, 11:
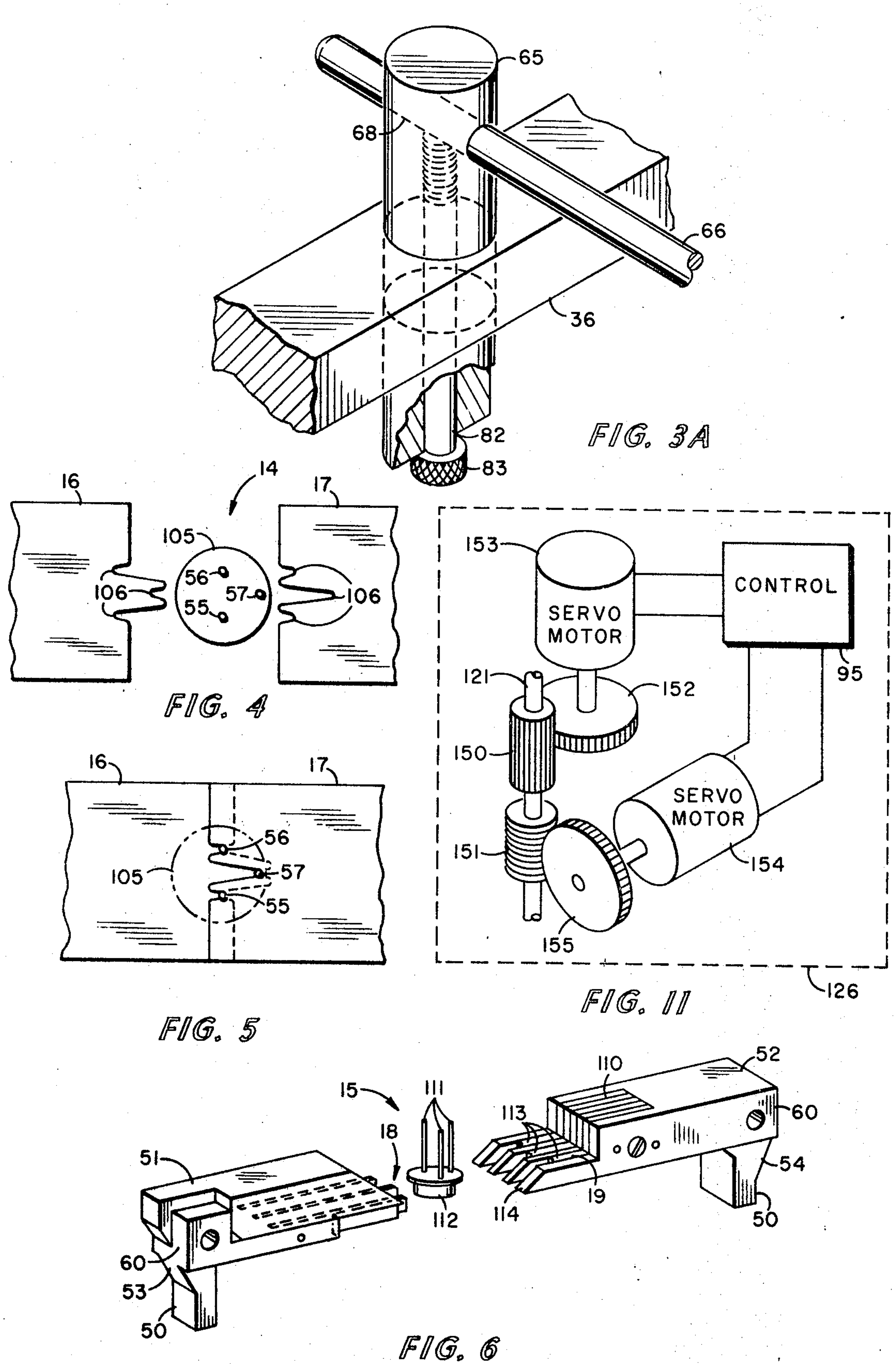

FIG. 3A diagrammatically shows a comb-actuating rod mounted on a power-transfer cross bar.

FIG. 4 is a diagrammatic showing of a pair of lead combs in a disengaged or rest position for showing the comb teeth detail and their relationship with the semiconductor unit leads.

FIG. 5 is a diagrammatic showing of FIG. 4 illustrated combs when in the closed or slidable engaging position with semiconductor unit leads.

FIG. 6 is a diagrammatic partial front view of a pair of lead-forming dies.

Figure 7:
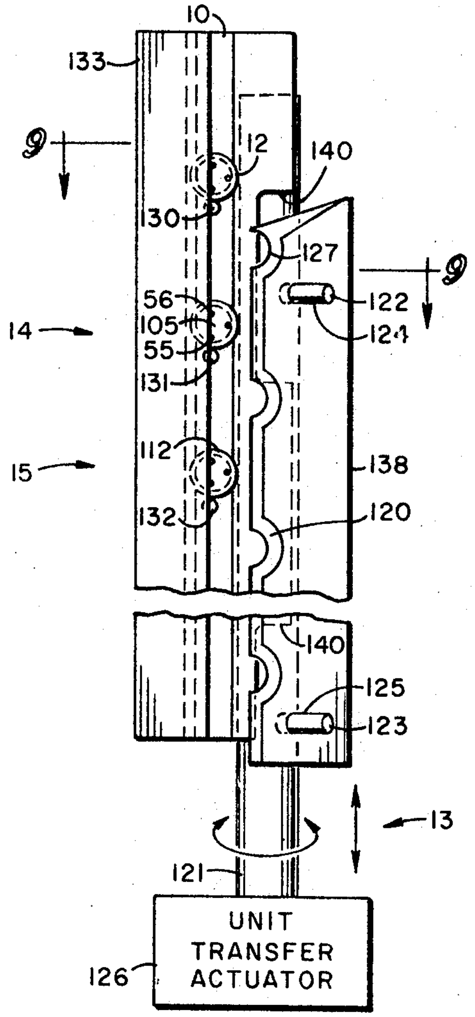

FIG. 7 is a diagrammatic showing of a unit-transfer mechanism at the conclusion of a machine cycle wherein the semiconductor units have been released in a unit-feeding track.

Figure 8:
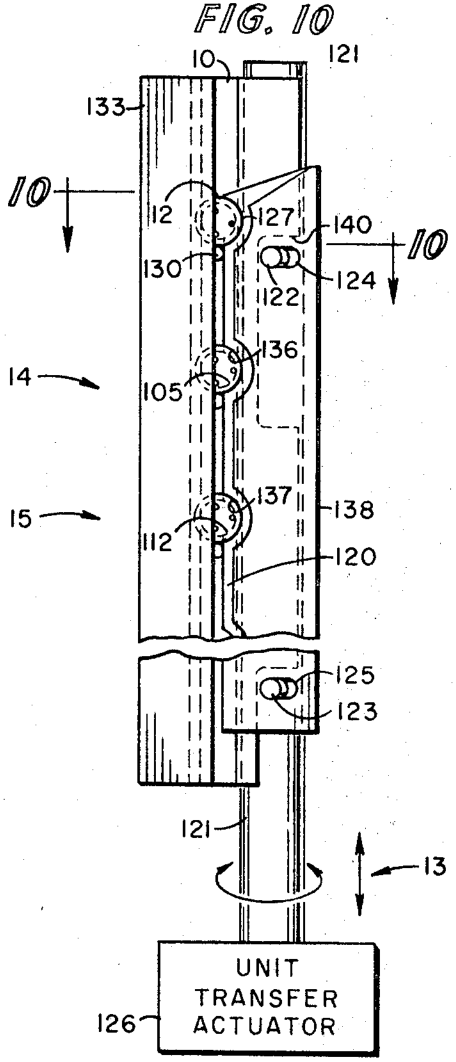

FIG. 8 is a second diagrammatic showing of a unit-transfer mechanism of FIG. 7 at a first portion of a machine cycle and engaging semiconductor units for transferring same to the two work stations.

Figure 9:
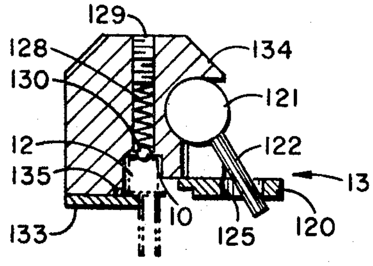
Figure 10:
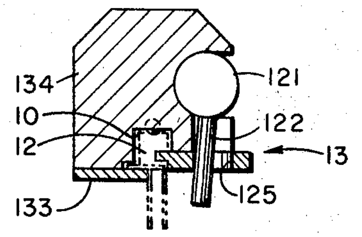

FIGS. 9 and 10 are partial diagrammatic views, respectively, of the FIG. 7 and 8 illustrations taken generally along lines 9—9 and 10—10 in the direction of the arrows.

FIG. 11 is a combined block-schematic and diagrammatic showing of a unit-transfer mechanism actuator usable with the illustrated machine.

DETAILED DESCRIPTION OF AN ILLUSTRATIVE EMBODIMENT

Referring more particularly to the drawing like numbers indicate like parts and structural features in the various views. A vertical unit-feeding track 10 is securely mounted on a frame 11 and feeds a plurality of transistors from a supply hopper (not shown), to work stations 14 and 15. For example, transistor 12 is held in unit-feeding track 10 by unit-transfer mechanism 13, later described, just above work station 14. Other transistors (not shown) are stacked in unit-feeding track 10 above transistor 12 and move downwardly by gravity. Unit-transfer mechanism 13, best seen in FIGS. 7 through 10, repetitively engages three transistors in unit-feeding track 10 to step same in a series of three machine cycles through the two work stations 14 and 15 and thence into chute 20. Station 14 has a pair of facing lead combs 16 and 17 for combing or prestraightening the leads of a transistor while station 15 has a pair of facing lead-forming dies 18 and 19 for forming and completing the straightening of the transistor leads. During a first machine cycle the lowest transistor in unit-feeding track 10 immediately above combing station 14 is moved into combing station 14. During the next successive machine cycle the next transistor in unit-feeding track 10 is moved to combing station 14 while the transistor then in combing station 14 is simultaneously moved to lead-forming station 15. In the event there was a transistor in lead-forming station 15, it is dropped into vertical chute 20 and falls into a collection bin (not shown). Then during the third successive machine cycle, the transistor entering station 14 during the first machine cycle is dropped into chute 20 with its leads completely straightened. During each machine cycle two transistors have their leads respectively combed and formed. Each transistor being processed is dropped into vertical chute 20 at the end of the third machine cycle after first entering combing station 14.

Figure 2:
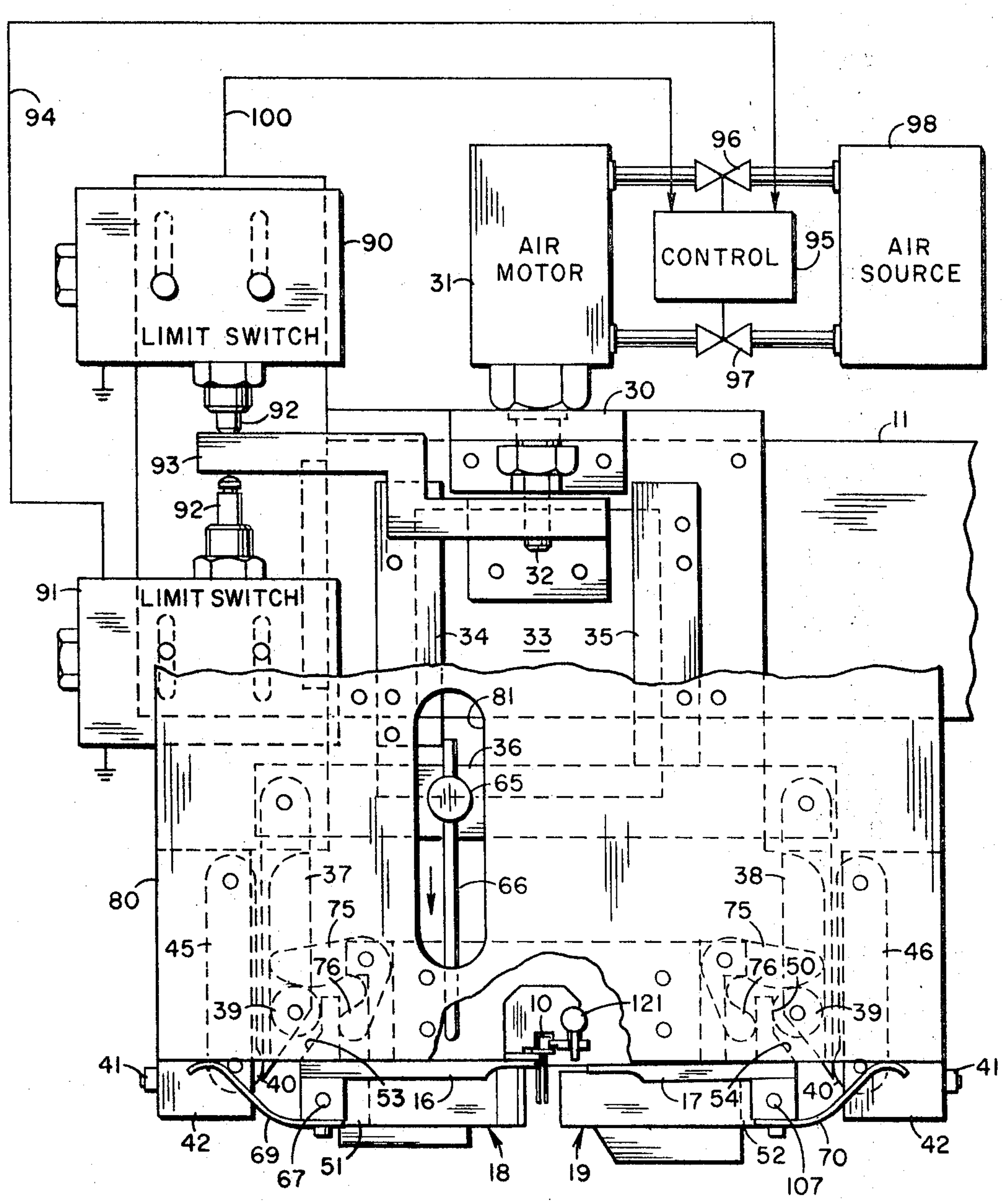
FIG. 2 is a diagrammatic partial plan view of the FIG. 1 illustrated apparatus while in the rest position.

The operation of combs 16, 17 and dies 18 and 19 is best understood with reference to FIGS. 2 and 3. Both work stations are mounted securely on frame 11 which has a depending flange 30 (FIG. 2) on which air motor 31 is securely mounted. Shaft 32 of air motor 31 extends forwardly and is fastened to a downwardly extending flange of slide plate 33. Slide plate 33 serves as an intermediate power-transfer member between air motor 31 and later described power-transfer members for closing and opening combs 16, 17 and dies 18, 19 with the forward and rearward movements of shaft 32, respectively. The side edges of slide plate 33 movably engage a pair of guide bars 34 and 35 mounted on frame 11. Power-transfer cross bar 36 is secured to the front portion of slide plate 33 and moves therewith. Cross bar 36 mounts a pair of forwardly-extending bearing slides 37 and 38. The bearing slides have a pair of rollers 39 rotatably mounted at their forward extremities. The outward-facing longitudinal edges of bearing slides 37 and 38, respectively, move on a pair of rollers 40 as the power-transfer assembly, including cross bar 36, is moved forward and backward in a reciprocating manner. Rollers 40 are respectively mounted on arms 45 and 46 pivotally secured to frame 11. A pair of set screws 41 extend laterally through the front-end portion of blocks 42 to the outer side of the respective arms 45 and 46 for laterally adjusting the rollers 40. This adjustment determines the engagement of dies 18 and 19 as well as the overlapping engagement of combs 16 and 17, as will become apparent.

In FIG. 2, the power-transfer assembly is shown in a rest position as later referred to, the rest position corresponds to the beginning and end of every machine cycle. In this position air-motor shaft 32 is at its rearward-most position with cam rollers 39 engaging the laterally-inward surfaces 50 of power-transfer members 51 and 52. Upon the forward movement of shaft 32, rollers 39 engage ramps 53 and 54 forcing power-transfer members 51 and 52 toward each other for closing dies 18, 19 and combs 16 and 17. Upon reaching the forward ends of the ramps 53 and 54, the dies 18, 19 are closed and the combs 16, 17 are overlapping but are still located adjacent unit-feeding track 10 not having started their forward combing action. As rollers 39 are forcing the power transfer members toward each other, dies 18 and 19 engage the leads of a transistor in work station 15 for performing final straightening operations as later described in more detail.

Upon reaching the forward ends of ramps 53 and 54 all the movable lead-straightening operations in station 15 have been accomplished. Dies 18 and 19 then set on the leads for a short time.

At this time combs 16 and 17 in work station 14 are intermeshed slidably engaging leads 55, 56 and 57 (FIG. 5) in preparation for sliding forwardly therealong for combing same. Rollers 39 continue forward movement on laterally-outward surfaces 60 (FIG. 3) of power-transfer members 51 and 52. Energy supplied by air motor 31 through the power-transfer assembly now perform work in station 14 by rotating combs 16 and 17 forwardly along leads 55, 56 and 57.

Comb rotation is caused by comb-actuating rod 66 engaging comb 16. Referring to FIGS. 3 and 3A, cross bar 36 has upstanding power post 65 with adjustable comb-actuating rod 66. As rollers 39 reach the end of ramps 53 and 54, comb-actuating rod 66 engages comb 16. Upon continued forward movement of cross bar 36, comb-actuating rod 66 forces comb 16 forwardly about its pivot axis 67. Since comb 16 has its teeth disposed behind comb 17, its forward movement engages the backside of comb 17, simultaneously forcing comb 17 forwardly along the leads 55, 56, and 57.

Comb-actuating rod 16 is adjustably secured in aperture 68 (FIG. 3A) of power post 65 such that the forwardmost movement of rollers 39 on laterally-outward surfaces 60 corresponds to comb rotation just short of the outer extremities of the transistor leads. For permitting adjustment of rod 66, post 65 is provided with an axially extending bore 82 (FIG. 3A). A set screw 83 threadingly engages the upper end of axial bore 82 adjacent aperture 68 and locks rod 66 against the upper surface of aperture 68. To adjust rod 66, set screw 83 is loosened and rod 66 axially slid forward or rearward for adjusting the engagement with the combs. For example, if the transistor in work station 14 is to have extremely short leads, then rod 66 is moved rearward such that there will be no engagement with comb 16 until after rollers 39 have progressed forwardly over a portion of laterally-outward surfaces 60. It is also possible to adjust rod 66 such that the outward movement of the comb 16 and 17 may begin just before rollers 39 reach the forward ends of the ramps 53 and 54. These adjustments are determined by the transistor lead lengths.

Upon reaching the forwardmost travel of rollers 39 over laterally-outward surfaces 60, the power-transfer assembly reverses its motion for returning the machine from the work position to the rest position. During this rearward movement, dies 18 and 19 are opened and combs 16 and 17 are released by actuating rod 66 to permit leaf springs 69 and 70 (compressed by the previously described forward movement) to return the combs to the FIG. 2 illustrated rest position. Also during the return movement, rotatable bell cranks 75 are engaged by rollers 39 for rotation such that cam surfaces 76 (FIG. 2) engage the laterally-inward edges of power-transfer members 51 and 52, forcing them laterally outward toward the rest position. Also, as will be described, the unit-transfer mechanism 13 is actuated during this return movement for advancing the transistors through the two work stations 14 and 15. During the forward movement of rollers 39, power-transfer members 51 and 52 engage cam surfaces 76 for rotating bell cranks 75 in the opposite directions to the just described rotations.

The assembly, as seen in FIG. 2, has cover plate 80 secured to frame 11 and which in turn supports unit feeding track 10. Cover plate 80 is disposed just above cross bar 36. Elongated slot 81 (FIG. 2) provides in plate 80 clearance for the reciprocating movement of power post 65.

The forward and backward limits of travel for the power-transfer assembly are determined by a pair of limit switches 90 and 91 (FIG. 2). Each switch has plunger 92 moved by the switch-actuating lever 93 secured to intermediate power-transfer or slide plate 33. Switches 90, 91 are adjustable as shown, such that the switches are respectively closed as lever 93 actuates the switches at the desired limits of travel. Switch 91 limits the forward movement of the power-transfer assembly to thereby limit the travel of rollers 39 over laterally-outward surfaces 60. Switch 91 is connected over line 94 to control 95, which may be of any usual design and is not pertinent to the practice of this invention. Control 95 is operative to open and close a pair of valves 96 and 97 for selectively supplying air from source 98 to air motor 31.

Upon the closure of limit switch 91, ground potential is supplied over line 94 to control 95 which then closes air valve 96. As later described, control 95 is then subsequently operative to open valve 97 for permitting air to flow into motor 31 from valve 97 forcing the power-transfer assembly to move rearwardly.

Lever 93 of power-transfer assembly; including slide plate 33, cross bar 36 and slides 37, 38; upon reaching the desired rest position, such as shown in FIG. 2 closes rearward-movement limit switch 90. Ground reference potential is then supplied over line 100 to control circuit 95 for closing valve 97 stopping the power-transfer assembly rearward movement. After a predetermined delay effected by control circuit 95, valve 96 is opened for moving the power-transfer assembly forwardly in a new machine cycle. Control 95 of known machine design is actuated in a known manner as more fully referred to later.

The action of combs 16 and 17 is now described in detail with respect to FIGS. 3, 4 and 5. FIG. 4 shows combs 16 and 17 in the rest position with respect to transistor 105 having leads 55, 56 and 57. The combs have symmetrically-formed lead-engaging notches, generally designated by numeral 106. As combs 16 and 17 move toward each other, comb 17 moving in front of comb 16, and are stopped such that the symmetrically formed notches 106 form small passageways around the respective electrical leads. FIG. 5 illustrates the position of the combs just as the rollers 39 have reached the forward end of ramps 53 and 54. Upon continued forward movement of rollers 39 over laterally outward surfaces 60, combs 16 and 17 are both rotated about their pivot axes 67 and 107 moving their overlapped free ends forwardly in a sweeping action to comb the leads 55, 56 and 57. As the combs rotate forwardly, return-leaf springs 69 and 70 are compressed against the front edge of cover plate 80. When the free ends of combs 16 and 17 reach the lead free ends, the combs are released by the rearward movement of comb-actuating rod 66. The combs are quickly returned to the rest position by the leaf springs 68 and 69.

Combs 16 and 17 have a sweeping action with respect to leads 55, 56 and 57. That is, adjacent the header of the transistor in the work station, combs rather snugly slidably engage the leads while at the forward limit of rotation the teeth are somewhat separated providing a looser engagement. This action is sufficient to arrange the leads in preparation for the lead straightening operation in work station 15. The movement of the combs are determined cojointly by the adjustment of comb-actuating rod 66 and the adjustment of limit switch 91 which of course controls the forward movement of the power-transfer assembly. In operating the machine it is usual to first adjust the forward movement of the power-transfer assembly, such that the dies 18 and 19 properly close; and then adjust rod 66 for proper operation of combs 16 and 17 in accordance with the unit lead length.

The operation of station 15 is best understood with reference to FIG. 6. Power-transfer member 52 has longitudinally-extending rectangular cavities 110 receiving die parts or blades 113 of die 19. Die 19 consists of a plurality of lead-forming blades 113 which respectively engage the leads 111 of transistor 112 for straightening same. Blades 113 have diagonally-shaped working faces, the planes of these faces lying in the plane of terminal portion 114 of power-transfer member 52. Each of the blades 113 and the adjacent tines 114 are alternated in the member 52. The blades 113 lengths are determined by the position and length of the leads 111. A separate blade length is supplied for each transistor lead length. Power-transfer member 51 has a similar set of rectangular cavities holding die 18 lead-forming blades. As the dies 18 and 19 are closed, tines 114 move past the inward portions of die 18.

Unit-transfer mechanism 13 is best understood with reference to FIGS. 7 through 10. FIGS. 7 and 9 illustrate the position of unit-transfer mechanism 13 a short period of time after rollers 39 (FIGS. 2 and 3) have reached the forwardmost travel, i.e., just prior to the rearward movement of the power-transfer assembly. FIGS. 8 and 10 illustrate unit transfer mechanism 13 after the start of a new machine cycle when transistors in unit-feeding track 10 are ready to be moved into or out of a work station.

As the power-transfer assembly moves rearwardly, the combs 16 and 17 and dies 18 and 19 release the transistors in work stations 14 and 15, respectively. As these transistors are released, unit-transfer mechanism indexing blade 120 moves away from unit-feeding track 10, disengaging transistor 105 in station 14 and transistor 112 in station 15 (FIG. 7). Indexing blade 120 is moved laterally away from the transistors by the counterclockwise rotation of shaft 121. Shaft 121 has radially-outwardly extending pins 122 and 123 movably disposed in slots 124 and 125 of indexing blade 120. After indexing blade 120 has moved to its far rightward or disengaged position, unit-transfer actuator 126 moves shaft 121 and indexing blade 120 upwardly for engaging transistors to be stepped through work stations 14 and 15. After shaft 121 is in its uppermost position, it is moved leftwardly (clockwise rotation of shaft 121) toward unit-feeding track 10 wherein it engages transistors 12, 105 and 112 (FIG. 8). Rods 122 and 123 engage the leftmost edge of slots 124 and 125, forcing the indexing blade 120 firmly against the cans of the transistors as best seen in FIG. 10. Next, unit-transfer actuator 126 moves shaft 121 downwardly transferring transistor 12 to work station 14, transistor 105 to work station 15, and transistor 112 which has had its leads straightened to vertical chute 20 whereupon it drops into a receiving hopper (not shown). If additional work functions are to be performed, additional work stations may be added by extending track 10 downwardly. For yieldably retaining transistors, track 10 has a plurality of spring-urged sapphire ball-bearing detents 130, 131 and 132 (FIG. 7). For example, detent ball 130 is urged against the lower edge of transistor 12 by spring 128 held in place by setscrew 129. When indexing blade 120 is not engaging the transistors, as seen in FIG. 7, the detent balls have sufficient urging to prevent transistors 12, 105 and 112, respectively, from falling downwardly in unit-feeding track 10. However, when index blade 120 is engaging the transistor, as seen in FIGS. 8 and 10, and is moved downwardly, there is sufficient engagement between index plate 120 and the cans of the transistors to force them respectively over the sapphire detent balls 130, 131 and 132. After index blade 120 has moved the transistors over the sapphire balls, it moves them to just above the next sapphire ball detent. For example, transistor 12 would be moved downwardly to just above ball 131 after the downward movement of index plate 120 as shown in FIG. 8. Index plate 120 is engaging and firmly holding the various transistors during the work operations previously described such that the combing and lead straightening operations can be carried on without moving the transistors and introducing strains therein.

Unit-feeding track 10, of known design, is arranged such that the leads 55 and 56 of transistor 105, for example, orient the transistor within unit-feeding track 10. To this end, a guide plate 133 is attached to the front face of block 134 in which track 10 is formed. Guide plate 133 extends outwardly over unit-feeding track 10 for slidably engaging the leads 55 and 56. Block 134 has a shoulder recess 135 slidably receiving the flange of a typical transistor can, such as in a TO-5 type. Indexing blade 120 has arcuate recesses 127, 136 and 137 for respectively engaging three different transistors. Indexing blade 120 also has a stiffening cover plate 138 spaced from the arcuate recesses such that cover plate 138 does not engage the flanges of the transistor cans. To accommodate the upward and downward movement of the shaft 121 radially-outwardly extending pins 122 and 123, track forming block 134 has a pair of vertically elongated recesses 140 in which the radially-outwardly extending pins move.

The rotation and reciprocating movement of shaft 121 is diagrammatically illustrated in FIG. 11. Shaft 121 has a pair of gear-tooth portions 150 and 151. Gear portion 150 has vertically or axially extending teeth engaged with drive gear 152 which in turn is actuated by a servomotor 153 under the control of control circuit 95. Control circuit 95 includes a set of timing cams which selectively operate servomotor 153. Further, limit switches may be added to the apparatus shown in FIGS. 7 and 8 such that index plate 120 is moved until a limit is reached whereupon servomotors 153 and 154 (FIG. 11) are stopped, i.e., limit switches are electrically interposed between the cam actuated (timing) switches (not shown) and the motor being controlled. Servomotor 153 rotates shaft 121 for selectively moving index blade 120 toward and away from unit-feeding track 10 as above described. Servomotor 154 has drive gear 155 engaging circumferentially extending gear teeth 151 for axially moving shaft 121 in a reciprocating manner.

Control 95 has a set of timing cams (not shown) of usual design that are rotated on a common shaft. Electrical switches and mechanical linkages to perform a variety of functions in accordance with good machine design practice are actuated by such cams. This aspect of the machine being of known arrangements is not described in detail to avoid occluding the teaching of the invention. It suffices to state that a machine cycle being initiated, either manually or automatically, the above-described functions are performed in the below tabulated sequence:

1. Initiate machine cycle.
2. Unit-transfer actuator 126 moves indexing blade 120 upwardly and laterally leftwardly to position illustrated in FIG. 8.
3. Unit-transfer actuator 126 moves indexing blade 120 downwardly to position and hold transistors in work stations 14 and 15.
4. Valve 96 is opened to actuate air motor 31 to move the power-transfer assembly forwardly.

5. During forward movement of the power-transfer assembly, rollers 39 engage ramps 53 and 54 moving power-transfer members 51 and 52 together.

6. Rollers 39 reach forward end of ramps 53 and 54. Dies 18 and 19 are now closed, and combs 16 and 17 are closed in overlapping relation. Forward movement of rollers 39 begins on laterally-outward surfaces 60.

7. Comb-actuating rod 66 engages comb 16. Sweeping action of combs 16 and 17 begins. (This action may begin before, after or simultaneously with rollers 39 reaching the forward end of ramps 53 and 54.)

8. Combs 16 and 17 reach the free ends of transistor leads; limit switch 91 is closed by lever 93. Forward motion of power-transfer assembly stops by valve 96 being closed.

9. Control 95 opens valve 97 to initiate rearward movement of the power-transfer assembly opening dies 18 and 19 and to release combs 16 and 17 for spring-urged rearward return.

10. Rollers 39 reach laterally inward surfaces 50. Dies 18 and 19 are completely open, combs 16, 17 are in rest position. Unit-transfer actuator 126 moves indexing plate 120 laterally rightward releasing transistors in unit-feeding track 10 to fall to next lower detent ball or chute 20. This action signifies end of one machine cycle.

11. Machine is ready to initiate a new machine cycle. If automatic, timing cam shaft (not shown) continues rotation to repeat the above-described cycle of operation. If manual, a manually-actuated switch (not shown) is set to initiate one machine cycle or a portion thereof.

I claim:

1. Cyclically operable apparatus for performing two successive work functions on a given unit in two successive machine cycles and performing said two functions on two different units in a single machine cycle, the apparatus having a frame, a power unit on the frame repetitively for moving a pair of opposed power-transfer members between work and rest positions, a unit-feeding track disposed adjacent to the power-transfer members and adapted to movably receive units on which work is to be performed, first and second work stations along said track, each performing a different work function: the improvement including in combination;

unit-transfer means on said unit-feeding track for receiving units on said unit-feeding track and for successively positioning a first received unit in said first work station, and then said second work station during the next successive machine cycle and for receiving a second unit and successively positioning said second unit in said first and second work stations, said second and first received units being simultaneously in said first and second work stations, respectively;

a pair of opposed work-performing members in said first work station and respectively movably mounted on said power-transfer members, said work-performing members having unit-engaging portions for performing work on a unit in said first work station;

a pair of opposed second work-performing members respectively mounted on said power-transfer members in said second work station having unit-engaging portions for performing a second work function on a unit in said second work station;

a single power-transfer assembly connecting said power unit to said power-transfer members for actuating said power-transfer members and said work-performing members such that work is performed in said first and second work stations in a successive manner during each machine cycle, and one of said work functions being performed when said power-transfer members is moving from said rest toward said work position.

2. The apparatus of claim 1 wherein said work in one of said stations is performed after said work-performing members have reached a work position, and means connecting said power-transfer means to said work-performing members in said one station when in said work position to perform a work function while in said work position.

3. Apparatus for arranging and forming leads extending from an electrical unit, the apparatus having a frame, a power-transfer assembly on the frame for repetitively moving a pair of opposed power-transfer members between work and rest positions in successive machine cycles of operation, a unit-feeding track disposed adjacent to the power-transfer members for movably receiving units with deformable leads extending in a first direction, first and second work stations along said unit-feeding track, the improvement including in combination:

unit-transfer means adjacent said unit-feeding track for receiving units on said unit-feeding track and for moving a first received unit to said first work station during a first machine cycle, then in the next occurring machine cycle for positioning said first received unit in said second work station and simultaneously positioning a second received unit in said first work station;

a pair of opposed lead combs in said first station respectively movably mounted on said power-transfer members for movements in said first direction but moving with said power-transfer members transverse to said first direction;

said combs having facing lead-engaging teeth, said teeth being in a closed position with respect to each other when said power-transfer members are in said work position forming a passageway for each lead of the unit;

a pair of opposed lead-forming dies respectively mounted on said power-transfer members in said second work station and being closed when said power-transfer members are in said work position and operative to form leads of any unit in said second work station when said power-transfer members are moving from said rest to said work position, and comb-actuating means in said power transfer assembly operatively engaging said combs when said power-transfer members are are in said work position for moving said combs along said leads of any unit in said first work station to prestraighten the same prior to lead formation in said second work station.

4. The apparatus of claim 3 wherein said combs are rotatably mounted on said power-transfer members, respectively, spring means engaging said frame and yieldably urging said combs to a position adjacent said unit feeding track, said comb-actuating means operative to force said combs forwardly in said first direction away from said unit-feeding track and thence release said combs for spring means actuated return movement upon completion of a lead-combing operation.

5. The apparatus of claim 3 wherein said comb-actuating means includes a crossbar having means operatively and cammingly engaging said power-transfer members for movement between work and rest positions, and an adjustable rod extending from said power-crossbar forwardly along the first direction to one of said combs for urging said comb forwardly along the unit leads for combing same.

6. The apparatus of claim 5 wherein said combs overlap when in said work position and said one comb being engaged by said adjustable rod to force another one of said combs forwardly along the unit leads, and springs for independently returning said combs toward said unit-feeding track upon completion of the lead-combing operation.

7. The apparatus of claim 6 wherein said crossbar moves said power-transfer members to said work position with said lead forming dies in said second work station being closed and then continues moving to an overtravel position, said adjustable rod first engaging said one comb when said second station dies are closed and rotating said combs forwardly away from said unit-feeding track as said crossbar moves toward said overtravel position.

8. Lead-combing apparatus, including in combination:

means for holding an electrical component in a fixed position with leads from said components extending generally in one direction;

a pair of facing comb members having symmetrically formed teeth for slidably engaging the leads adjacent the component;

pivot means mounting said comb members for arcuate movement along the lead lengths away from said holding means, and means for urging said combs to rotate along the length of said leads such that the slidable engagement between the comb and the lead decreases as the combs move away from said holding means.

9. The apparatus of claim 8 wherein said engaging means further includes a power source and an adjustable rod engaging only one of said combs, the combs being in overlapping relation for slidable lead engagement, said one comb being closer to said holding means than another one of said combs and operative when being engaged by said adjustable rod to rotate said other comb forwardly away from said holding means such that both combs are simultaneously moved along the lead length.

10. Apparatus for straightening deformable wire leads extending from an electrical unit, including in combination:

means for successively feeding electrical components to work stations in a train of such components with the deformable leads of said components extending generally in one direction;

combing means at a first one of said stations for slidably engaging the leads of the components adjacent said feeding means and for forward movement in an arcuate manner away from said feeding means whereby the leads are combed and semistraightened;

unit-transfer means for transferring an electrical component having its lead straightened in said first station to a second station with no intermediate storage, die means in said second station engageable with said leads over the entire length thereof for forming said leads;

die-actuating means moving said die means into an engagement with said leads and forming them when so moving said dies; and said die-actuating means having overtravel means in which no work is performed in said second station and means connecting said die-actuating means to said combs during said overtravel portion for moving the combs outwardly from said feeding means to semistraighten the leads in said first station.

11. Cyclically operable apparatus for performing two successive work functions on a given unit in two successive machine cycles and performing said two functions on two different units during one machine cycle, the apparatus having a frame, a power-transfer assembly mounted on the frame for repetitive movements in forward and rearward directions between work and rest positions, a unit-feeding track disposed adjacent the power-transfer assembly and adapted to movably receive units on which work is to be performed, first and second work stations along said unit-feeding track each performing a different work function; the improvement including in combination:

unit transfer means on said track for receiving units in said track and for successively positioning a first received unit in said first work station and thence in said second work station during the next successive machine cycle and for receiving a second unit and successively positioning said second unit in said first and second work stations, said second and first received units being simultaneously in said first and second work stations, respectively;

a pair of opposed and facing work-performing members in said first work station and movably mounted on said frame for opening and closing movements between work and rest positions and operatively connected to said power-transfer assembly for closing during said forward movement and for opening during said rearward movement, and said work-performing members each having unit-engaging portions for performing work on a unit in said first work station when in a work position;

a pair of opposed second work-performing members movably mounted on said frame in said second work station and movably mounted on the frame for closing and opening movements and operatively connected to said power-transfer members for closing movements when said assembly is forwardly moving and for opening movement when said assembly is rearwardly moving;

one of said pairs of work-performing members performing work on a unit when moving from an open to a closed position and another of said work-performing members in another work station having a further operative connection to said power-transfer assembly for performing work on a unit at least after said one of said pairs of work-performing members have closed.